(12) United States Patent
Gee et al.

(10) Patent No.: US 11,702,832 B2
(45) Date of Patent: Jul. 18, 2023

(54) VACUUM-ASSISTED TOILET SYSTEMS AND METHODS OF USING THE SAME

(71) Applicant: BRIGHAM YOUNG UNIVERSITY, Provo, UT (US)

(72) Inventors: Kent L. Gee, Provo, UT (US); Scott D. Sommerfeldt, Provo, UT (US); Scott L. Thomson, Provo, UT (US)

(73) Assignee: BRIGHAM YOUNG UNIVERSITY, Provo, UT (US)

( * ) Notice: Subject to any disclaimer, the term of this patent is extended or adjusted under 35 U.S.C. 154(b) by 0 days.

(21) Appl. No.: 16/967,806

(22) PCT Filed: Mar. 21, 2019

(86) PCT No.: PCT/US2019/023412
§ 371 (c)(1),
(2) Date: Aug. 6, 2020

(87) PCT Pub. No.: WO2020/190301
PCT Pub. Date: Sep. 24, 2020

(65) Prior Publication Data
US 2021/0404162 A1 Dec. 30, 2021

(51) Int. Cl.
*E03D 5/02* (2006.01)
*E03D 1/32* (2006.01)
(Continued)

(52) U.S. Cl.
CPC ............... *E03D 5/024* (2013.01); *E03D 1/32* (2013.01); *E03D 1/36* (2013.01); *E03D 11/18* (2013.01); *B64D 11/02* (2013.01); *E03D 2201/20* (2013.01)

(58) Field of Classification Search
CPC .. E03D 5/024; E03D 1/32; E03D 1/36; E03D 11/18; E03D 2201/20; B64D 11/02
(Continued)

(56) References Cited

U.S. PATENT DOCUMENTS

| 434,116 A | 8/1890 | Ricketts |
| 2,075,030 A | 3/1937 | Dunean |
| (Continued) | | |

FOREIGN PATENT DOCUMENTS

| CN | 1111704 A | 11/1995 |
| CN | 1115961 A | 1/1996 |
| (Continued) | | |

OTHER PUBLICATIONS

U.S. Appl. No. 16/968,259, filed Aug. 7, 2020.
(Continued)

*Primary Examiner* — Tuan N Nguyen
(74) *Attorney, Agent, or Firm* — Dorsey & Whitney LLP

(57) ABSTRACT

The embodiments disclosed herein are directed towards vacuum-assisted toilet systems and methods of using the vacuum-assisted toilet systems. An example vacuum-assisted toilet system includes a toilet bowl defining an outlet and a flush valve fluidly coupled to the outlet. The vacuum-assisted toilet system also includes at least one water source fluidly coupled to the toilet bowl. The water source is configured to supply water to the toilet bowl. The vacuum-assisted toilet system also includes at least one water actuator coupled to the water source. The water actuator is configured to control the amount of water that is supplied by the water source to the toilet bowl. The vacuum-assisted toilet system also includes a controller that is configured to at least partially control the operation of one or more components of the vacuum-assisted toilet system, such as at least one of the flush valve or the water actuator.

18 Claims, 8 Drawing Sheets

(51) Int. Cl.
*E03D 1/36* (2006.01)
*E03D 11/18* (2006.01)
*B64D 11/02* (2006.01)

(58) Field of Classification Search
USPC .............................. 4/316, 406, 407, 431–435
See application file for complete search history.

(56) References Cited

U.S. PATENT DOCUMENTS

| | | | |
|---|---|---|---|
| 3,995,328 | A | 12/1976 | Carolan et al. |
| 4,989,277 | A | 2/1991 | Tsutsui et al. |
| 5,007,117 | A | 4/1991 | Oldfelt et al. |
| 5,317,763 | A | 6/1994 | Frank et al. |
| 5,469,586 | A * | 11/1995 | Tsutsui ................. E03D 5/10 4/415 |
| 5,604,938 | A | 2/1997 | Tyler |
| 6,085,366 | A | 7/2000 | Pondelick et al. |
| 6,385,789 | B1 | 5/2002 | Pondelick et al. |
| 6,668,391 | B1 | 12/2003 | Lee et al. |
| 6,910,231 | B2 | 6/2005 | Breiing et al. |
| 7,207,073 | B1 | 4/2007 | Blankenburg |
| 8,370,969 | B2 * | 2/2013 | Bowcutt ................. E03D 5/00 4/406 |
| 10,683,652 | B1 * | 6/2020 | Beach ................... E03D 9/14 |
| 2003/0229939 | A1 | 12/2003 | Berman |
| 2006/0137085 | A1 | 6/2006 | Xiang et al. |
| 2006/0225200 | A1 | 10/2006 | Wierenga |
| 2008/0060121 | A1 | 3/2008 | Andreiu |
| 2008/0185477 | A1 | 8/2008 | Seibt |
| 2008/0237397 | A1 * | 10/2008 | Seibt ................ B64D 11/02 4/431 |
| 2009/0199332 | A1 | 8/2009 | Mesun et al. |
| 2010/0313344 | A1 | 12/2010 | Ina et al. |
| 2012/0066826 | A1 | 3/2012 | Molina |
| 2013/0099477 | A1 | 4/2013 | Horiguchi |
| 2013/0305444 | A1 | 11/2013 | Boodaghians et al. |
| 2015/0059075 | A1 * | 3/2015 | Oxenfarth ............. B60R 15/04 4/406 |
| 2016/0376779 | A1 | 12/2016 | Boeltl et al. |
| 2017/0009438 | A1 | 1/2017 | Stachowski et al. |
| 2017/0030063 | A1 | 2/2017 | Godines |
| 2017/0121955 | A1 | 5/2017 | Hall et al. |
| 2017/0152657 | A1 | 6/2017 | Seimiya |
| 2017/0247871 | A1 | 8/2017 | Mukerji et al. |
| 2018/0355598 | A1 | 12/2018 | Villalobos Lopez |
| 2019/0257065 | A1 | 8/2019 | Schibur et al. |
| 2020/0018055 | A1 | 1/2020 | Garrels et al. |
| 2020/0378103 | A1 | 12/2020 | Nakagawa et al. |
| 2021/0317649 | A1 | 10/2021 | Helmstetter et al. |

FOREIGN PATENT DOCUMENTS

| | | |
|---|---|---|
| CN | 104334452 A | 2/2015 |
| CN | 106436864 A | 2/2017 |
| DE | 102015214636 A1 | 2/2017 |
| EP | 0679211 B1 | 8/1996 |
| EP | 2365144 A1 | 9/2011 |
| EP | 2365144 A9 | 7/2012 |
| GB | 1063711 A | 3/1967 |
| WO | 2020190302 A1 | 9/2020 |

OTHER PUBLICATIONS

International Search Report and Written Opinion from International Application No. PCT/US2018/023414 dated May 24, 2019.
International Search Report and Written Opinion from International Application No. PCT/US2019/023410 dated Jun. 11, 2019.
International Search Report and Written Opinion from International Application No. PCT/US2019/023412 dated Jun. 11, 2019.
U.S. Appl. No. 16/967,521, filed Aug. 5, 2020.
Notice of Allowance for U.S. Appl. No. 16/967,521 dated Dec. 10, 2021.
Notice of Allowance for U.S. Appl. No. 16/968,259 dated Feb. 16, 2022.
Rose, et al., "Noise Reduction of a Vacuum-Assisted Toilet", Impact of Noise Control Engineering: 47th International Congress and Exposition on Noise Control Engineering, Aug. 2018, pp. 1314-1323.
Issue Notification for U.S. Appl. No. 16/967,521 dated Jul. 20, 2022.
Notice of Allowance for U.S. Appl. No. 16/967,521 dated Mar. 30, 2022.
Notice of Allowance for U.S. Appl. No. 16/968,259 dated Jun. 2, 2022.
Notice of Allowance for U.S. Appl. No. 16/968,259 dated Sep. 21, 2022.

\* cited by examiner

VACUUM-ASSISTED TOILET SYSTEMS AND METHODS OF USING THE SAME

BACKGROUND

Vacuum-assisted toilets are commonly used in airplanes, cruise ships, and other locations where water is scarce since vacuum-assisted toilets may operate using less water than other types of toilets. Vacuum-assisted toilets are also starting to be used in locations that do not have the water restrictions of airplanes, cruise ships, etc., such as in residential applications, to conserve water. However, vacuum-assisted toilets may generate loud noises when flushed. As such, users and manufactures of vacuum-assisted toilet continue to seek new and improved vacuum-assisted toilets and/or methods of using vacuum-assisted toilets.

SUMMARY

In an embodiment, a method for operating a vacuum-assisted toilet is disclosed. The method includes switching a flush valve that is operably coupled to a toilet bowl to an open state thereof to remove waste from the toilet bowl. The method also includes, after switching the flush valve to the open state thereof, switching the flush valve to a closed state thereof. The method further includes supplying a continuous supply of water from at least one water source to a toilet bowl at least between starting to switch the flush valve to the open state thereof and finishing to switch the flush valve to the closed state thereof at least by supplying a first amount of water to the toilet bowl for a first duration and, after supplying the first amount of water, supplying a second amount of water to the toilet bowl for a second duration. The second amount of water is greater than the first amount of water.

In an embodiment, a method for operating a vacuum-assisted toilet is disclosed. The method includes switching a flush valve that is operably coupled to a toilet bowl to an open state thereof to remove waste from the toilet bowl. The method also includes, after switching the flush valve to the open state thereof, switching the flush valve to a closed state thereof. The method further includes supplying a continuous supply of water from at least one water source to a toilet bowl at least between starting to switch the flush valve to the open state thereof and finishing to switch the flush valve to the closed state thereof with at least one water actuator that is fluidly coupled to the at least one water source at least by supplying a first amount of water to the toilet bowl for a first duration; after supplying the first amount of water, supplying a second amount of water to the toilet bowl for a second duration; and, after supplying the second amount of water, supplying a third amount of water to the toilet bowl for a third duration. The second amount of water is less than the first amount of water and the third amount of water is greater than the second amount of water. Additionally, the method includes at least partially controlling the operation of the at least one water actuator with an electrical controller that is communicably coupled to the at least one water actuator. The electrical controller includes one or more operational instructions stored on non-transitory memory and at least one processor configured to execute the one or more operational instructions.

In an embodiment, a vacuum-assisted toilet system is disclosed. The vacuum-assisted toilet system includes a toilet bowl, a flush valve fluidly coupled to the toilet bowl, at least one water source coupled to the toilet bowl that is configured to supply water to the toilet bowl, and at least one water actuator coupled to the at least one water source. The at least one water actuator is configured to control an amount of water provided from the at least one water source to the toilet bowl. The vacuum-assisted toilet system also includes an electrical controller coupled to the at least one water actuator that is configured to at least partially control the at least one water actuator. The electrical controller includes non-transitory memory storing one or more operational instructions and at least one processor configured to execute the one or more operational instructions. Executing the one or more operational instructions with the at least one processor causes the at least one water actuator to provide a continuous supply of the water from the water source to the toilet bowl at least between starting to switch the flush valve to an open state thereof and finishing to switch the flush valve to a closed state thereof.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Figure 1A:
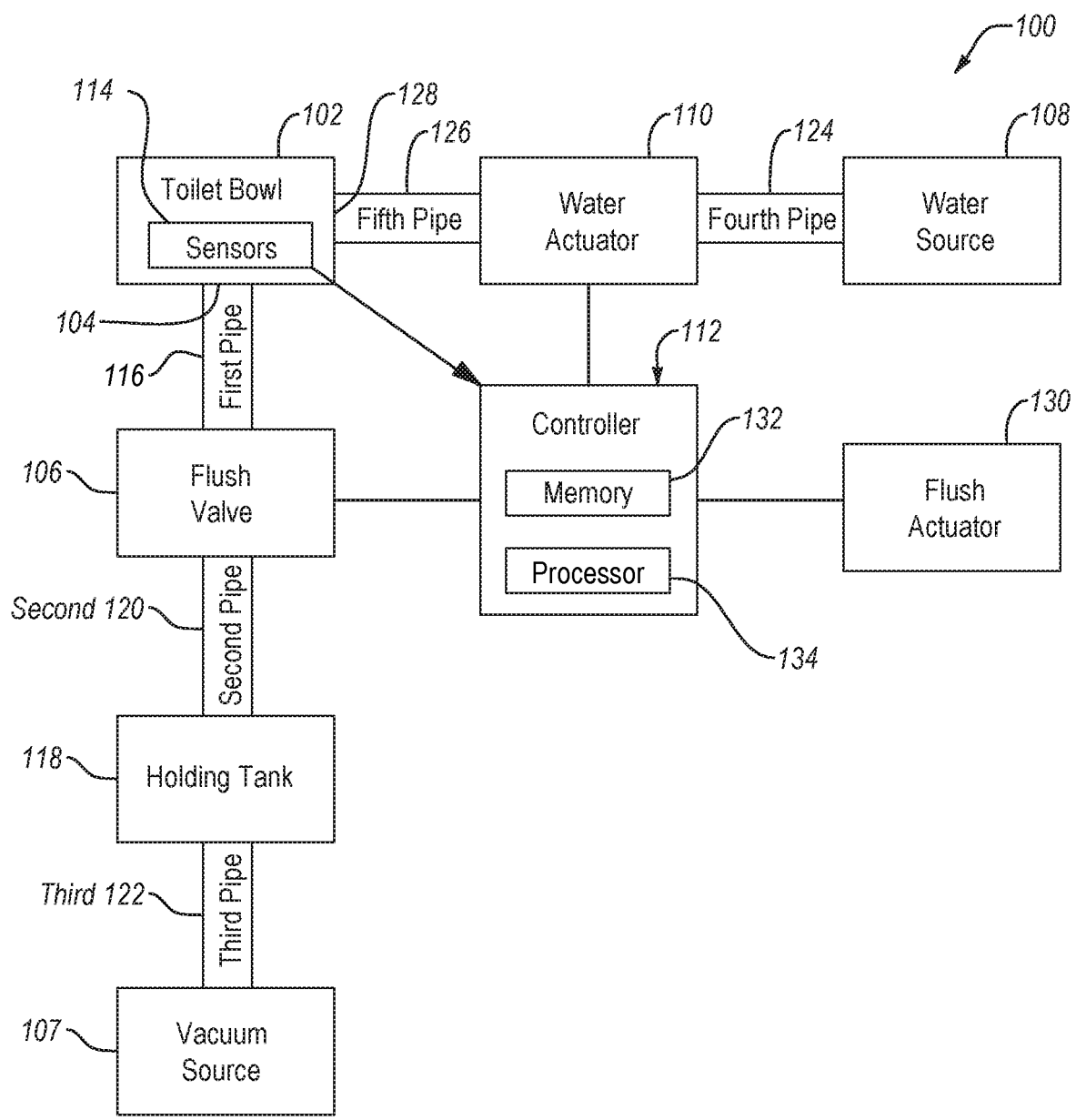
FIG. 1A is a schematic illustration of a vacuum-assisted toilet system, according to an embodiment.

The embodiments disclosed herein are directed towards vacuum-assisted toilet systems and methods of using the vacuum-assisted toilet systems. An example vacuum-assisted toilet system includes a toilet bowl defining an outlet and a flush valve fluidly coupled to the outlet. The vacuum-assisted toilet system also includes at least one water source fluidly coupled to the toilet bowl. The water source is configured to supply water to the toilet bowl. The vacuum-assisted toilet system also includes at least one water actuator coupled to the water source. The water actuator is configured to control the amount of water that is supplied by the water source to the toilet bowl. The vacuum-assisted toilet system also includes a controller configured to at least partially control the operation of one or more components of the vacuum-assisted toilet system, such as at least one of the flush valve or the water actuator.

As used herein, the "amount of water" refers to at least one of the water flow rate (e.g., volume of water per unit of time) or the water pressure (e.g., Pascals, pounds per square inch, etc.) of the water supplied from the water source to the toilet bowl. Although the water flow rate and water pressure is used interchangeably herein, it is noted that there are slight differences between the two. For example, holding the water flow rate constant (or substantially constant) may cause variations in the water pressure, and vice versa. Also, the water flow rate and the water pressure may be measured using different devices.

Flushing the vacuum-assisted toilet system includes switching the flush valve from a closed state to an open state. Switching the flush valve to the open state causes waste to be exposed to a vacuum which pulls the waste through the flush valve and to a waste collection system (e.g., a holding tank, a sewer system, a septic tank, etc.). As used herein, waste refers to water, urine, stool, toilet paper, air, or other material received by the toilet bowl and is evacuated from the toilet bowl when the vacuum-assisted toilet system is flushed. Flushing the vacuum-assisted toilet system causes a loud noise to be generated. For example, the vacuum may cause the waste to turbulently flow through at least the flush valve which may generate the loud noise at the toilet bowl. The amplitude of the noise may vary while flushing the vacuum-assisted toilet system.

It has been found that supplying a continuous flow of water from the water source to the toilet bowl decreases the amplitude of the noise generated while flushing the vacuum-assisted toilet system. As such, the water source and the water actuator can be configured to continuously supply water to the toilet bowl. Further, it has been found that increasing the amount of water supplied to the toilet bowl further decreases the amplitude of the noise generated by flushing the vacuum-assisted toilet system.

Vacuum-assisted toilet systems are often used in airplanes or cruise ships with limited water supplies and/or are used to conserve water. It may be impossible to supply water to the toilet bowl at the amount of water that is selected to sufficiently reduce the maximum amplitude of the noise generated by flushing the vacuum-assisted toilet system due to the large quantities of water required. However, the amounts of water supplied by the water source may be varied (e.g., dynamically varied) depending on the amplitude of the noise generated by flushing the vacuum-assisted toilet system. Varying the amount of water provided to the toilet bowl may reduce the noise generated by the waste flowing through the flush valve while also limiting the quantity of water used. For example, the amount of water supplied by the water source may be selected to be relatively greater when the expected amplitude of the noise is expected to relatively high (e.g., when actively switching the flush valve between the open and closed state) and relatively lower when the expected amplitude of the noise is expected to be relatively lower (e.g., when the flush valve is fully in the open state).

It has been found that the quantity (e.g., volume) of waste present in the toilet bowl before switching the flush valve to the open state reduces the amplitude of the noise that is initially generated when the vacuum-assisted toilet system is flushed. For example, it has been found that the reduction in the amplitude of the noise initially generated by flushing the vacuum-assisted toilet system and the time that the amplitude of noise is reduced is proportional to the quantity of waste present in the toilet bowl before switching the flush valve to the open state. The vacuum-assisted toilet system may be configured to and the methods of using the vacuum-assisted toilet system may include determining the quantity of the waste present in the toilet bowl before switching the flush valve to the open state and, if the quantity of the waste is below a threshold value, supplying water from the water source to the toilet bowl to increase the quantity of the waste.

FIG. 1A is a schematic illustration of a vacuum-assisted toilet system 100, according to an embodiment. The vacuum-assisted toilet system 100 includes a toilet bowl 102 that defines an outlet 104. The outlet 104 of the toilet bowl 102 is fluidly coupled to a flush valve 106 that is positioned downstream from the outlet 104. The flush valve 106 is configured to controllably and selectively switch between a closed state and an open state. The flush valve 106 is in the closed state when waste flow through the flush valve 106 is restricted and the open state when waste flow through the flush valve 106 is permitted. The flush valve 106 is also fluidly coupled to a waste collection system (e.g., holding tank 118, sewer system, septic tank, etc.) and a vacuum source 107. The vacuum source 107 is configured to provide a vacuum that pulls waste towards the waste collection system. The vacuum-assisted toilet system 100 also includes at least one water source 108 and at least one water actuator 110. The water source 108 is configured to supply water to the toilet bowl 102 and the water actuator 110 is configured to control the amount of water that is supplied to the toilet bowl 102 from the water source 108. The vacuum-assisted toilet system 100 may also include a controller 112 (e.g., electrical controller) that is configured to control one or more components of the vacuum-assisted toilet system 100. For example, the controller 112 may at least partially control at least one of the flush valve 106 or the water actuator 110. In an embodiment, the controller 112 may at least partially control one or more components of the vacuum-assisted toilet system 100 responsive to receiving one or more sensed characteristics of the toilet bowl 102 from one or more sensors 114.

The toilet bowl 102 may include any suitable toilet bowl. For example, the toilet bowl 102 generally includes at least one concave portion configured to receive human waste (e.g., urine, stool, etc.) from an individual. The concave portion may also be configured to receive other types of waste, such as toilet paper, depending on the application of the toilet bowl 102. The toilet bowl may also include a seat configured to support an individual. The seat may include at least one hole that allows human waste to enter the concave portion of the toilet bowl 102 while the individual is seated on the seat.

In an embodiment, the vacuum-assisted toilet system 100 may include a first pipe 116 extending between the outlet 104 of the toilet bowl 102 to the flush valve 106. The first pipe 116 may fluidly couple the toilet bowl 102 to the flush valve 106. It is noted that the first pipe 116 may hold the waste instead of or with the toilet bowl 102 before the flush valve 106 switches to its open state.

The first pipe 116 may be formed from a plurality of pieces connected together or may include a single piece. Forming the first pipe 116 from a single piece may limit leaks in the first pipe 116 than if the first pipe 116 was formed from a plurality of pieces. Generally, the first pipe 116 is distinct from the toilet bowl 102. However, at least a portion of the first pipe 116 may be integrally formed with the toilet bowl 102. The first pipe 116 may be integrally formed with the toilet bowl 102, for example, when the vacuum-assisted toilet system 100 is made for residential applications and is at least partially formed from a single piece of porcelain. When the first pipe 116 is integrally formed with the toilet bowl 102, the first pipe 116 differs from the toilet bowl 102 because a width of the first pipe 116 is substantially constant (e.g., varies by at most 30%) whereas the width of the toilet bowl 102 generally varies. Also, the first pipe 116 is generally distinct from the flush valve 106. However, at least a portion of the first pipe 116 may be integrally formed with the flush valve 106. When the first pipe 116 is integrally formed with the flush valve 106, the first pipe 116 differs from the flush valve 106 because at least one of the flush valve 106 may form a bulge relative to the first pipe 116 or the first pipe 116 terminates at any portion of the flush valve 106 that may hold a moveable obstruction that adjustably restricts flow through the flush valve 106.

The first pipe 116 spaces the flush valve 106 from the toilet bowl 102 to partially acoustically insulate the toilet bowl 102 from the noise generated by the turbulent flow of the waste through the flush valve 106. The ability of the first pipe 116 to acoustically insulate the toilet bowl 102 from the flush valve 106 generally depends on the length of the first pipe 116. As used herein, the length of the first pipe 116 refers to the length of a center of a flow path defined by the first pipe 116. In an embodiment, the first pipe 116 exhibits a length of about 7 cm to about 30 cm, such as about 15 cm since, generally, the flush valve 106 is positioned within about 15 cm of the outlet 104. However, it is noted that the first pipe 116 may exhibit lengths greater than about 30 cm, for example, when the first pipe 116 follows an indirect path to the flush valve 106 (e.g., the first pipe 116 includes one or more bends). Examples of pipes that follow an indirect path to the flush valve 106 are disclosed in PCT Application No. PCT/US2019/023414 filed on Mar. 21, 2019, the disclosure of which is incorporated herein, in its entirety, by this reference.

In an embodiment, the first pipe 116 is omitted from the vacuum-assisted toilet system 100. In such an embodiment, the flush valve 106 may be directly connected to the outlet 104 of the toilet bowl 102.

The flush valve 106 may include any suitable valve. For example, the flush valve 106 may include a ball valve, a butterfly valve, a solenoid, or any other suitable valve. Depending on the type of valve that forms the flush valve 106, the flush valve 106 may include a body forming an inlet port and an outlet port. The flush valve 106 may also include a moveable obstruction in the body that adjustably restricts fluid flow through the flush valve 106. The moveable obstruction restricts fluid flow through the flush valve 106 when the flush valve 106 is in the closed state and allows fluid flow through the flush valve 106 when the flush valve 106 is in the open state.

The flush valve 106 also includes (e.g., is integrally formed with or is mechanically coupled to) a valve actuator configured to switch the flush valve 106 between the open state and the closed state. For example, activating the valve actuator may move the moveable obstruction of the flush valve 106 from a position that restricts waste flow through the flush valve 106 to a position that allows waste flow through the flush valve 106, and/or vice versa. The valve actuator may include any actuator that may switch the flush valve 106 between the closed state and the open state. For example, the flush valve 106 may be an electric motor, an electrical energy supply (e.g., when the flush valve 106 is a solenoid), or any other suitable actuator.

Conventional vacuum-assisted toilet systems generally have a flush valve positioned near or adjacent to the toilet bowl thereof. For example, the flush valve of conventional vacuum-assisted toilet systems may be at least one of attached to the toilet bowl, attached to a structure that supports the toilet bowl, attached to a structure attached to the toilet bowl, or positioned within 15 cm of the toilet bowl (e.g., positioned within 15 cm of the outlet of the toilet bowl). In an embodiment, the flush valve 106 may be positioned near or adjacent to the toilet bowl 102 like any of flush valves of the conventional vacuum-assisted toilet systems discussed above. In such an embodiment, the vacuum-assisted toilet system 100 may be used in locations configured to receive the conventional vacuum-assisted toilet systems. For instance, it may be difficult and/or expensive to redesign or modify an existing airplane or cruise ship design to accommodate the vacuum-assisted toilet system 100 if the flush valve 106 is spaced from the toilet bowl 102. Further, positioning the flush valve 106 proximate to the toilet bowl 102 may allow the vacuum-assisted toilet system 100 to be formed by retrofitting a conventional vacuum-assisted toilet system to include at least some features disclosed herein (e.g., include the controller 112). However, in an embodiment, the flush valve 106 may be spaced from the toilet bowl 102.

As discussed, the flush valve 106 is fluidly coupled to a waste collection system configured to receive the waste. In an embodiment, the vacuum-assisted toilet system 100 is configured to be used on an airplane, a cruise ship, or another location not connected to a sewer system, sceptic tank, or other suitable alternatives. In such an embodiment, the waste collection system includes at least one holding tank 118. The holding tank 118 is fluidly coupled to the flush valve 106 and defines an interior space configured to receive and store the waste in an at least substantially fluid tight manner.

In an embodiment, the holding tank 118 may be fluidly connected to the flush valve 106 via a second pipe 120. The second pipe 120 may extend between the flush valve 106 and the holding tank 118. In an embodiment, the second pipe 120 may be omitted from the vacuum-assisted toilet system 100, for example, when the flush valve 106 is adjacent to or integrally formed with the holding tank 118. The holding tank 118 may also be fluidly connected to the vacuum source 107, for example, via a third pipe 122 (e.g., the third pipe 122 extends between the holding tank 118 and the vacuum source 1074). In an embodiment, the third pipe 122 may be omitted from the vacuum-assisted toilet system 100, for example, when the holding tank 118 is adjacent to or integrally formed with the vacuum source 107.

It is noted that the holding tank 118 may be omitted from the vacuum-assisted toilet system 100, for example, when the waste collection system includes a sewer system, a septic tank, etc. For example, the holding tank 118 may be omitted from the vacuum-assisted toilet system 100 when the vacuum-assisted toilet system 100 is configured to be used in a residential application since, generally, residential buildings are connected to sewer systems, septic tanks, etc. When the holding tank 118 is omitted from the vacuum-assisted toilet system 100, the second pipe 120 may extend from the flush valve 106 towards the vacuum source 107 or the flush valve 106 may be positioned adjacent to or integrally formed with the vacuum source 107.

As discussed, the vacuum-assisted toilet system 100 includes a vacuum source 107 configured to apply a vacuum (e.g., a pressure significantly less than room pressure) to one or more components of the vacuum-assisted toilet system 100 depending on whether the flush valve 106 is in its respective open or closed state. In the illustrated embodiment, the vacuum source 107 is configured to apply the vacuum to the holding tank 118 so an interior space of the holding tank 118 exhibits the vacuum. Causing the interior space of the holding tank 118 to exhibit the vacuum may facilitate pulling the waste into the holding tank 118. The vacuum source 107 may also apply the vacuum to at least the downstream side of the flush valve 106. When the flush valve 106 is in the open state, the vacuum source 107 also applies the vacuum to the toilet bowl 102 pulling the waste into the holding tank 118.

It is noted that, when the waste collection system does not include the holding tank 118, the vacuum source 107 may be positioned between the flush valve 106 and the sewer system, septic tank, etc. The vacuum source 107 may apply a vacuum to a location between the flush valve 106 and the sewer system, septic tank, etc. thereby pulling the waste to the location and towards the sewer system, septic tank, etc.

The type of vacuum source 107 used in the vacuum-assisted toilet system 100 may depend on the application of the vacuum-assisted toilet system 100. In an embodiment, the vacuum source 107 may be a vacuum pump, for example, when the vacuum source 107 is used in a cruise ship, a residential application, etc. In an embodiment, when the vacuum-assisted toilet system 100 is used in an airplane, the vacuum source 107 may be an exterior of an airplane. For example, during flight, an interior of the airplane may exhibit a pressure (e.g., room pressure) of about 0.7 atmospheres to about 1.0 atmospheres while an exterior of the plane exhibits a pressure of about 0.4 atmospheres or less at a cruising altitude of about 35,000 feet. In other words, relative to the pressure of the interior of the airplane, the exterior of the airplane is a vacuum. The exterior of the airplane may be the vacuum source 107 and the third pipe 122 may extend from the holding tank 118 to an exterior of the airplane. However, it is noted that, the vacuum source 107 may include a vacuum pump instead of or with the exterior of the airplane when the vacuum-assisted toilet system 100 is used in an airplane. In an embodiment, the vacuum source 107 may be integrally formed with the water source 108 when the water source 108 includes a water tank. For example, emptying the water tank of the water source 108 may, when the water tank is substantially fluid tight, create a vacuum in the water tank. The vacuum in the water tank may then remove the waste (e.g., including the water originally in the water tank) from the toilet bowl 102.

As discussed, the vacuum-assisted toilet system 100 includes at least one water source 108. The water source 108 may include any device that can supply water to the toilet bowl 102 and may depend on the application of the vacuum-assisted toilet system 100. In an example, the water source 108 is a water tank that defines an interior reservoir configured to hold and, if at least partially filled, holds water. The water in the water tank may be potable water, greywater, or any other type of water. The water source 108 may be a water tank, for example, when the vacuum-assisted toilet system 100 is used in an airplane, cruise ship, etc. In an example, the water source 108 is connected to a plumbing system. In such an example, the water supplied by the water source 108 may be potable water. In an example, the water source 108 may include a water tank directly connected to plumbing system.

In an embodiment, the vacuum-assisted toilet system 100 may include a fourth pipe 124 extending from the water source 108 to the water actuator 110. The fourth pipe 124 fluidly couples the water source 108 to the water actuator 110. However, the third pipe 120 may be omitted from the vacuum-assisted toilet system 100, for example, when the water actuator 110 is adjacent to or integrally formed with the water source 108.

The water actuator 110, as discussed, is configured to control the amount of water that is supplied from the water source 108 to the toilet bowl 102. Controlling the amount of water with the water actuator 110 may better control the noise generated during operation while simultaneously limiting the amount of water that is used. The water actuator 110 may include any actuator configured to control the amount of water. In an embodiment, the water actuator 110 includes a valve configured to switch between an open state, a closed state, and one or more intermediate states. In such an embodiment, the water actuator 110 may be configured to be in the closed state when the vacuum-assisted toilet system 100 is not being used. However, the water actuator 110 may switch to at least one of the open state or the one or more intermediate states during operation. For example, the water actuator 110 may be in the open state when the maximum amount of water is requested and may be in the one or more intermediate states when a requested amount of water is less than the maximum amount. In an embodiment, the water actuator 110 includes a pump. In such an example, the water actuator 110 may increase an amount of water beyond what the water source 108 may supply without the water actuator 110.

In an embodiment, the vacuum-assisted toilet system 100 includes a fifth pipe 126. The fifth pipe 126 extends between and fluidly couples the water actuator 110 to the toilet bowl 102. For example, the toilet bowl 102 may include one or more inlets 128 formed and the fourth pipe 124 may be fluidly coupled to the one or more inlets 128. In an embodiment, the fifth pipe 126 is omitted from the vacuum-assisted toilet system 100, for example, when the water actuator 110 is adjacent to the toilet bowl 102.

The vacuum-assisted toilet system 100 may include a flushing actuator 130. The flushing actuator 130 may include, for example, a handle or button configured to be manipulated by an individual. Manipulating the flushing actuator 130 may cause the vacuum-assisted toilet system 100 to flush. Flushing the vacuum-assisted toilet system 100 may cause at least the flush valve 106 to switch to the open state and the water actuator 110 to allow the water source 108 to continuously supply water to the toilet bowl 102. The flushing actuator 130 may be coupled to the controller 112 so manipulating the flushing actuator 130 causes the controller 112 to at least partially control at least the operation of the flush valve 106 and the water actuator 110.

In the illustrated embodiment, the controller 112 is an electrical controller that includes memory 132 (e.g., non-transitory memory) and at least one processor 134. The memory 132 stores one or more operational instructions and the at least one processor 134 is configured to execute the one or more operational instructions. For example, the one or more operational instructions may include instructions on how to control one or more components of the vacuum-assisted toilet system 100 and the at least one processor may at least partially control the one or more components.

The one or more operational instructions may include instructions that control the amount of water supplied from the water source 108 to the toilet bowl 102. The one or more operational instructions may include varying (e.g., dynamically varying) the amount of water supplied from the water source 108 depending on the expected or detected amplitude of the noise generated by operating the vacuum-assisted toilet system 100. FIGS. 1B to 1G are graphs illustrating different operational instructions 136*b-g* that may control the operation of one or more components of the vacuum-assisted toilet system 100, according to an embodiment. However, it is noted that the operational instructions 136b-g may include other suitable forms of instruction (e.g., tables, code, etc.) other than the graphs shown in FIGS. 1B to 1G and that the principles governing the other suitable forms of instruction are similar to the shown graphs.

Figure 3:
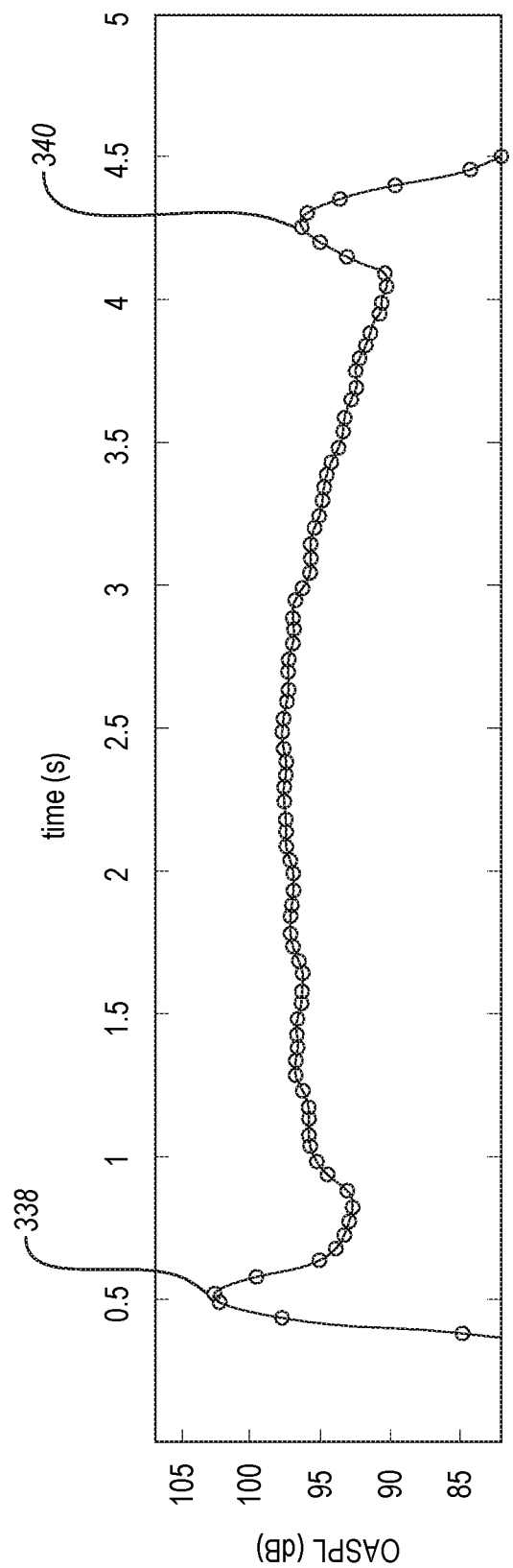
FIG. 3 is a graph illustrating noise detected over time after flushing the vacuum-assisted toilet system of the comparative example over time.

To facilitate the discussion of the graphs of FIGS. 1B to 1G, it is assumed that the expected amplitude of the noise generated by the vacuum-assisted toilet system 100 when no water is supplied from the water source 108 is similar to the noise profile shown in FIG. 3. As such, reference will be made to FIG. 3 when discussing the operational instructions 136b-g. However, it is noted that the noise profile generated by the vacuum-assisted toilet system 100 may differ from the noise profile shown in FIG. 3, for example, when additional components disclosed or known in the art are added to the vacuum-assisted toilet system 100 or components are removed from the vacuum-assisted toilet system 100 as disclosed herein.

Figure 1B:
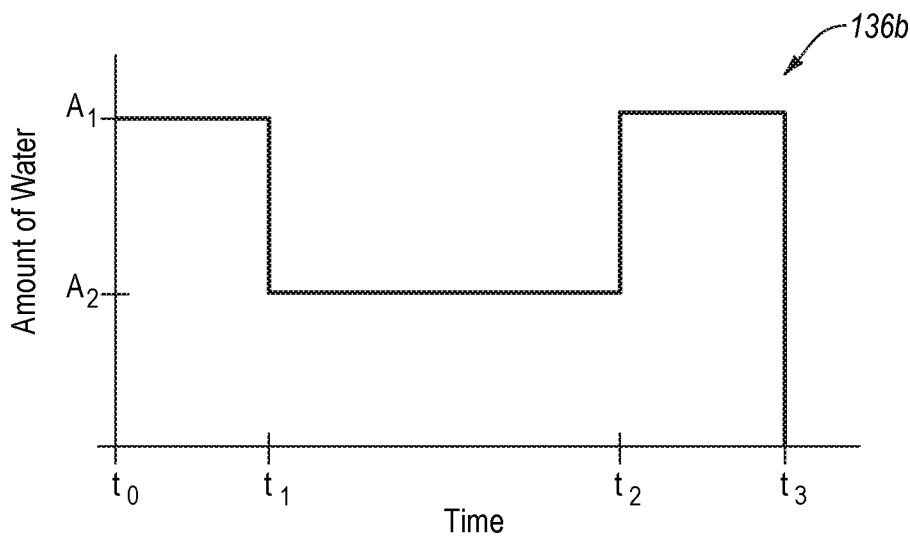
FIGS. 1B to 1G are graphs illustrating different operational instructions that may control the operation of one or more components of the vacuum-assisted toilet system, according to an embodiment.

Referring now to FIG. 1B, the operational instruction 136b may include providing a first amount of water $A_1$ (e.g., a first water flow rate or a first water pressure) during a first duration between an initial time $t_0$ (e.g., when the flush valve 106 switches from the closed state to the open state) to a first time $t_1$. The first amount of water $A_1$ may be configured to reduce an amplitude of a first spike in the noise, as shown in FIG. 3 ("first spike 338"). After the first duration, the operational instructions may include decreasing the amount of water supplied by the water source 108 to the second amount of water $A_2$ during a second duration between the first time $t_1$ and a second time $t_2$. The second amount of water $A_2$ is configured to reduce the amplitude of the noise generated between the first spike 328 and a second spike 340 in the amplitude of the noise shown in FIG. 3 ("second spike 340"). As shown in FIG. 1B, the second amount of water $A_2$ is held relatively constant. However, FIG. 3 demonstrates that the noise generated between the first spike 338 and the second spike 340 may vary slightly, especially near the first spike 338 and the second spike 340. As such, referring back to FIG. 1B, the second amount of water $A_2$ may be configured to vary with time. After the second duration, the operational instructions may include increasing the amount of water supplied by the water source 108 back to the first amount of water $A_1$ for a third duration between the second time $t_2$ and a third time $t_3$. The first amount of water $A_1$, since it is greater than the second amount of water $A_2$, may be configured to reduce the amplitude of the noise of the second spike 340.

Figure 1C:
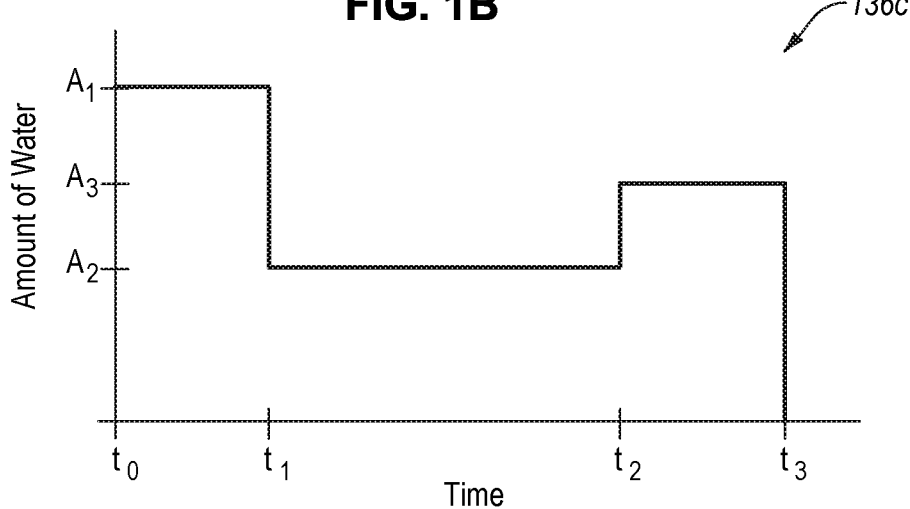

However, as shown in FIG. 3, the second spike 340 is less than the first spike 338. The amount of water needed to reduce the amplitude of the second spike 340 may be less than is needed to reduce the amplitude of the first spike 338. Referring to FIG. 1C, the operational instruction 136c may include providing a first amount of water $A_1$ for a first duration and a second amount of water $A_2$ for a second duration like the operational instruction 136b of FIG. 1B. However, the operational instruction 136c may include, after the second duration, providing a third amount of water $A_3$ for a third duration between the second time $t_2$ and the third time $t_3$, wherein the third amount of water $A_3$ is less than the first amount of water $A_1$ and greater than the second amount of water $A_2$. As such, the third amount of water $A_3$ causes less water to be used during the execution of the operational instruction 136c than during the execution of operational instruction 136b.

Figure 1D:
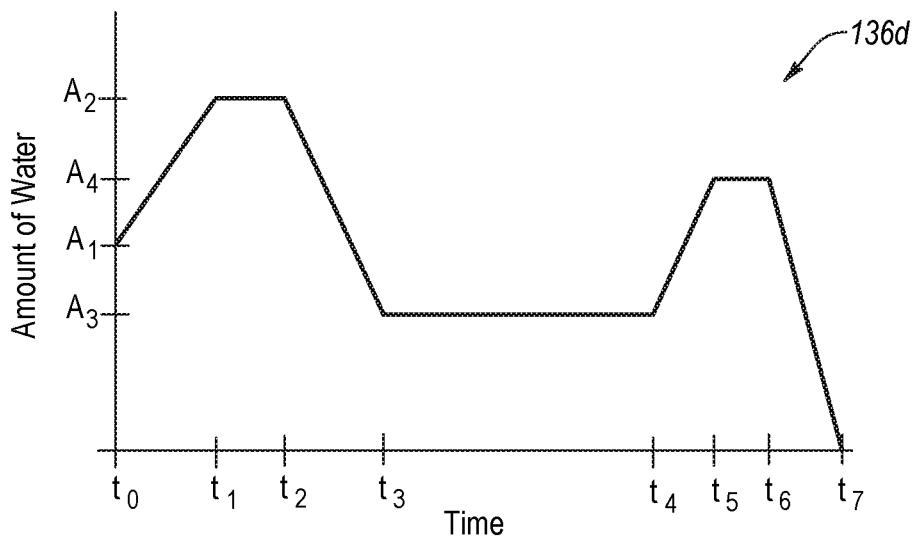

However, as shown in FIG. 3, the noise generated does not abruptly increase or decrease and, instead, increases or decreases at a selected rate. As such, in an embodiment, the amount of water provided during operating the vacuum-assisted toilet system 100 may be increased or decreased over time. Referring to FIG. 1D, the operational instruction 136d includes increasing the amount of water from a first amount of water $A_1$ to a second amount of water $A_2$ during a first duration between an initial time $t_0$ and a first time $t_1$. Increasing the amount of water from the first amount of water $A_1$ to the second amount of water $A_2$ during a first duration may be configured to reduce the amplitude of the noise generated before reaching a maximum of the first spike 338 of FIG. 3. It is noted that the first amount of water $A_1$ may be greater than 0 (as shown) or may be zero. After the first duration, the operational instruction 136d may include maintaining the amount of water supplied from the water source 108 to the toilet bowl 102 at the second amount of water $A_2$ for a second duration between the second time $t_2$ and the third time $t_3$. The second amount of water $A_2$ may be configured to reduce the amplitude of the noise generated at the first spike 338. As illustrated, the second duration may be greater than zero. However, it is noted that that the second duration may be infinitesimally small since the maximum amplitude of the first spike 338 may only exist for an infinitesimally small period of time. After the second duration, the operational instruction 136d may include decreasing the amount of water from the second amount of water $A_2$ to a third amount of water $A_3$ over a third duration between the third time $t_3$ and a fourth time $t_4$. Decreasing the second amount of water $A_2$ to the third amount of water $A_3$ over a third duration may be configured to reduce the amplitude of the noise generated immediately after reaching a maximum of the first spike 338 of FIG. 3. The operational instructions 135d may then include maintaining the amount of water at the third amount of water $A_3$ for a fourth period between the third time $t_3$ to a fourth time $t_4$. Maintaining the amount of water at the third amount of water $A_3$ may be configured to reduce the amplitude of the noise generated between the first and second spikes 338, 340. The operational instruction 136d may then include increasing the amount of water from the third amount of water $A_3$ to a fourth amount of water $A_4$ during a fifth duration between the fourth time $t_4$ and a fifth time $t_5$. Increasing the amount of water from the third amount of water $A_3$ to the fourth amount of water $A_4$ during the fifth duration may be configured to reduce the amplitude of the noise generated before reaching a maximum of the second spike 340 of FIG. 3. After the fifth duration, the operational instruction 136d may include maintaining the amount of water at the fourth amount of water $A_4$ for a sixth duration between the fifth time $t_5$ and a sixth time $t_6$. The fourth amount of water $A_4$ may be configured to reduce the amplitude of the noise generated at the maximum of the second spike 340. As illustrated, the sixth duration may be greater than zero. However, it is noted that that the sixth duration may be infinitesimally small since the maximum of the second spike 340 may exist for an infinitesimally small period of time. After the sixth duration, the operational instruction 136d may include decreasing the amount of water supplied from the water source 108 to the toilet bowl 102 from the fourth amount of water $A_4$ to zero over a seventh duration between the sixth time $t_6$ and a seventh time $t_7$. Decreasing the fourth amount of water $A_4$ to zero over a seventh duration may be configured to reduce the amplitude of the noise generated immediately after reaching a maximum of the second spike 340 of FIG. 3.

Figure 1E:
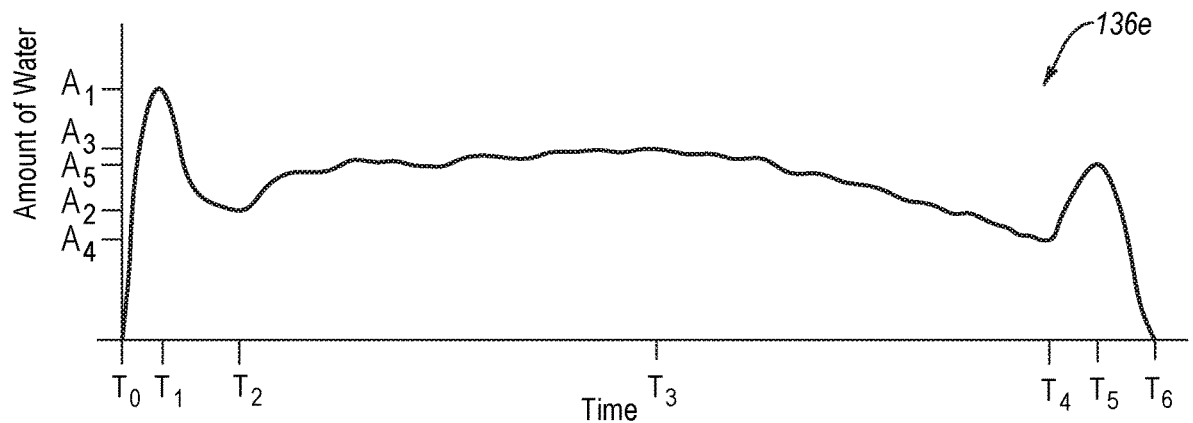

In an embodiment, as shown in FIG. 1E, the operational instruction 136e may be selected to generally correspond to the noise profile shown in FIG. 3. For example, the operational instruction 136e may include increasing the amount of water from zero to a first amount of water $A_1$ over a first duration between an initial time $t_0$ to a first time $t_1$. The first time $t_1$ may correspond to the first spike 338 and the first amount of water $A_1$ may be configured to reduce the amplitude of noise generated at the first spike 338. The operational instruction 136e may include decreasing the amount of water from the first amount of water $A_1$ to a second amount of water $A_2$ over a second duration between the first time $t_1$ and a second time $t_2$. The second time $t_2$ may correspond to a local minima of the noise profile shown in FIG. 3 immediately after the first spike 338 and the second amount of water $A_2$ may be configured to reduce the amplitude of noise generated at this minima. The operational instruction 136e may then include increasing the amount of water from the second amount $A_2$ to a third amount $A_3$ over a third duration between the second time $t_2$ and a third time $t_3$. The third time $t_3$ may correspond to a local maxima of the noise profile shown in FIG. 3 between the first spike 338 and the second spike 340 and the third amount of water $A_3$ may be configured to reduce the amplitude of noise generated at this maxima. The operational instruction 136e may then include gradually decreasing the amount of water from the third amount of water $A_3$ to a fourth amount of water $A_4$ over a fourth duration between the third time $t_3$ and a fourth time $t_4$. The fourth time $t_4$ may correspond to a local minima of the noise profile shown in FIG. 3 immediately before the second spike 340 and the fourth amount of water $A_4$ may be configured to reduce the amplitude of noise generated at this minima. The operational instruction 136e may then include increasing the amount of water from the fourth amount of water $A_4$ to a fifth amount of water $A_5$ over a fifth duration between the fourth time $t_4$ to a fifth time $t_5$. The fifth time $t_5$ may correspond to the second spike 340 and the fifth amount of water $A_5$ may be configured to reduce the amplitude of noise generated at the second spike 340. The operational instruction 136e may then include decreasing an amount of water from the fifth amount of water $A_5$ to zero over a sixth duration between the fifth time $t_5$ to a sixth time $t_6$. It is noted that the operational instruction 136e may maintain at least one of the amount of water $A_1$, $A_2$, $A_3$, $A_4$, or As for a duration greater than zero or for an infinitesimally small period of time for the reasons previously discussed.

Figure 1F:
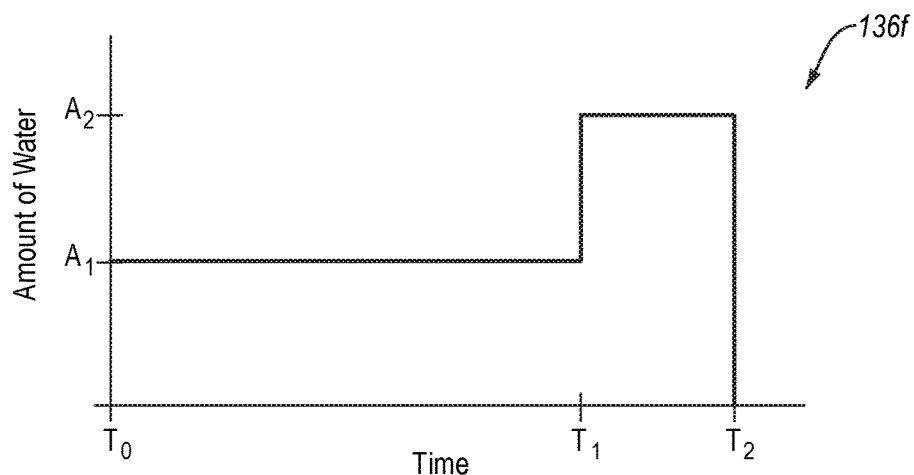
Figure 1G:
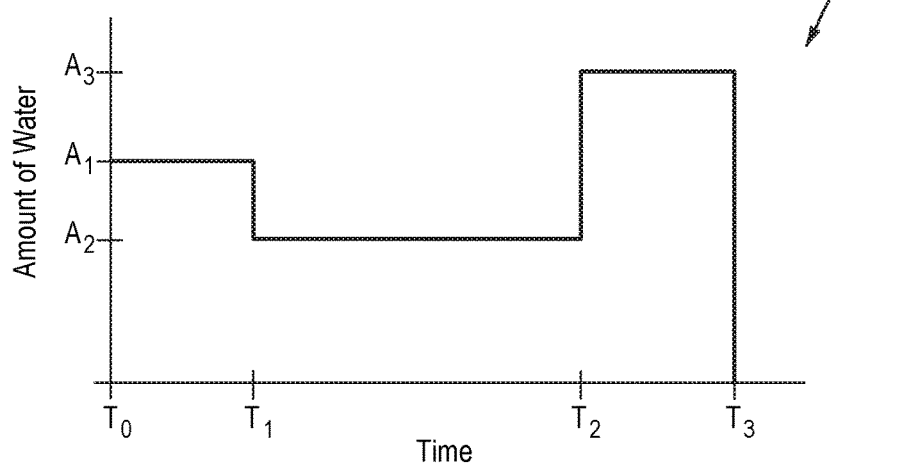

As previously discussed, increasing the amount of waste (e.g., water, urine, etc.) in the toilet bowl 102 before switching the flush valve 106 to the open state decreases the amplitude of the noise initially generated by flushing the vacuum-assisted toilet system 100. Referring to FIG. 1F, when the toilet bowl 102 includes enough waste, the operational instruction 136f may include supplying a first amount of water $A_1$ for a first duration between an initial time $t_0$ and a first time $t_1$. The first amount of water $A_1$ may be configured to reduce the amplitude of noise generated between the first and second spikes 338, 340 shown in FIG. 3. However, the operational instruction 136f do not include supplying an amount that is greater than the first amount $A_1$ that is configured to reduce the amplitude of noise by the first spike 338 because, in the illustrated embodiment, the operational instruction 136f are relying on the amount of waste that is initially present in the toilet bowl 102 to reduce the amplitude of the noise generated by the first spike 338. The operational instruction 136f then includes increasing the amount of water from the first amount of water $A_1$ to a second amount of water $A_2$ and maintaining the second amount of water during a second duration between the first time $t_1$ and a second time $t_2$. The second amount of water $A_2$ may be configured to reduce the amplitude of noise generated by the second spike 340. The operational instruction 136f may then include decreasing the amount of water to zero after the second time $t_2$.

In an embodiment, the amount of waste that is present in the toilet bowl 102 before switching the flush valve 106 to the open state cannot reduce the amplitude of the noise generated by the first spike 338. In such an embodiment, referring to FIG. 1G, the operational instruction 136g may include supplying a first amount of water $A_1$ over a first duration between an initial time $t_0$ to a first time $t_1$. The first amount of water $A_1$, combined with the amount of waste that is present in the toilet bowl 102, may be configured to reduce the amplitude of noise generated by the first spike 338. The operational instruction 136g may then include providing a second amount of water $A_2$ for a second duration between the first time $t_1$ and a second time $t_2$ and then providing a third amount of water $A_3$ for a third duration between the second time $t_2$ and a third time $t_3$. The third amount of water $A_3$ may be configured to reduce the amplitude of noise generated by the second spike 340. In an example, the third amount of water $A_3$ may be greater than the first amount of water $A_1$.

The operational instructions 136b-136g shown in FIGS. 1B to 1G are provided for illustrative purposes only. In an example, the memory 132 may include at least one of the operational instructions 136b-136g, such as a plurality of the operational instructions 136b-136g. In an example, the memory 132 may include one or more additional operational instructions that control the amount of water supplied to the toilet bowl 102 and the duration that each amount is supplied to the toilet bowl 102 instead of or in addition to at least one of the operational instructions 136b-g. In an example, the one or more additional operational instructions may include a combination of two or more of the operational instructions 136b-g or include operational instructions distinct from the operational instructions 136b-g.

In an embodiment, the operational instructions may include instructions to switch the flush valve 106 between the open and closed states thereof. In an example, the operational instructions may include instructions to switch the flush valve 106 to the open state after providing a first amount of water to the toilet bowl 102. In an embodiment, the operational instructions may include instructions directed towards operating the vacuum source 107.

Referring to FIG. 1A, as discussed, the at least one processor 134 executes the one or more operational instructions. For example, responsive to executing the one or more operational instructions, the at least one processor 134 may instruct the flush valve 106 to switch to the open state and/or the water actuator 110 to allow the water source 108 to provide a continuous supply of water to the toilet bowl 102 in accordance with the one or more operational instructions.

In an embodiment, the controller 112 includes a mechanical controller instead of or with the electronic controller. The mechanical controller does not include memory or a processor. Instead, the mechanical controller may include one or more levers, gears, springs, etc. The mechanical controller may be operably coupled to the flushing actuator 130 so manipulation of the flushing actuator 130 causes mechanical actuation of the mechanical controller. Mechanical actuator of the mechanical controller may cause the mechanical controller to at least partially control the operation of the vacuum-assisted toilet system 100 as disclosed herein (e.g., switch the flush valve 106 between the open and closed states, vary the amount of water provided to the toilet bowl 102, etc.).

As discussed, the vacuum-assisted toilet system 100 may include one or more sensors 114. The sensors 114 are configured to sense one or more characteristics of the toilet bowl 102. In an example, the sensors 114 may be disposed or otherwise attached to the toilet bowl 102. In an example, the sensors 114 are spaced from the toilet bowl 102 but can still detect one or more characteristics of the toilet bowl 102. The sensors 114 are also communicably coupled to the controller 112 and are configured to transmit the sensed characteristics to the controller 112. The controller 112 may at least partially control the operation of the one or more components of the vacuum-assisted toilet system 100 responsive to receiving the sensed characteristics of the toilet bowl 102.

In an embodiment, the one or more sensors 114 are configured to detect a volume of waste present in the toilet bowl 102 at least before switching the flush valve 106 to the open state. Examples of sensors that can detect the volume of the waste in the toilet bowl 102 may include a level sensor, a scale, or an optical sensor. The sensors 114 may transit the sensed volume of the waste in the toilet bowl 102 to the controller 112 and the controller 112 may at least partially control the operation of the vacuum-assisted toilet system 100 responsive to receiving the sensed characteristics. The controller 112 may analyze the sensed characteristics to determine whether the amount of waste in the toilet bowl 102 exceeds a threshold value. The threshold value may include, for example, a volume of at least about 100 milliliters ("ml"), at least about 125 ml, at least about 150 ml, at least about 200 ml, at least about 250 ml, at least about 300 ml, at least about 400 ml, at least about 500 ml, at least about 750 ml, at least about 1,000 ml, or in ranges of about 100 ml to about 200 ml, about 150 ml to about 250 ml, about 200 ml to about 300 ml, about 250 ml to about 400 ml, about 300 ml to about 500 ml, about 400 ml to about 750 ml, or about 500 ml to about 1000 ml. It is currently believed that a volume of waste exceeding any of the above threshold valves may decrease the amplitude of the noise generated by flushing the vacuum-assisted toilet system 100. In an example, if the controller 112 determines that the volume of the waste meets or exceeds the threshold value, the controller 112 may allow the flush valve 106 to switch to the open state. However, in such an example, if the controller 112 determines that the volume of the waste is below the threshold valve, the controller 112 may direct the water source 108 to supply additional water to the toilet bowl 102 (e.g., the controller 112 directs the water actuator 110 to allow the water source 108 to supply the water) so the volume of waste meets or exceeds the threshold valve. In an example, the controller 112 may select one or more operational instructions stored in the memory 132 responsive to determining that the volume of waste did or did not meet or exceed the threshold valve. For instance, the controller 112 may select one or more operational instructions that are the same as or similar to at least one of the operational instructions 136*b-e* of FIGS. 1B to 1E if the volume of waste did not meet or exceed the threshold value. The controller 112 may select one or more operational instructions that are the same as or similar to at least one of the operational instructions 136*f-g* of FIG. 1F or 1G if the volume of waste met or exceeded the threshold valve.

In an embodiment, the controller 112 may include one or more sensors 114 that detect a composition of the waste. For example, different types of waste may better reduce the amplitude of the noise generated by flushing the vacuum-assisted toilet system 100 compared to other types of waste. Not wishing to be bound by theory, it is believed that more viscous waste (e.g., solid or highly viscous stool or toilet paper) decreases the speed of the waste flowing through the flush valve 106 than less viscous waste (e.g., urine or diarrhea). It is noted that decreasing the speed of the waste flowing through the flush valve 106 may decrease the amplitude of the noise generated by flushing the vacuum-assisted toilet system 100. Examples of sensors that can detect the composition of the waste includes a pH sensor (e.g., the pH sensor may detect the presence and quantity of urine since urine is acidic) or an optical sensor. The sensors 114 may transit the sensed composition of the waste to the controller 112 and the controller 112 may at least partially control the operation of the vacuum-assisted toilet system 100 responsive to receiving the sensed characteristics. For example, the controller 112 may analyze the sensed characteristics to determine the composition of the waste and, responsive to the analysis, increase or decrease the amount of water provided to the toilet bowl 102 based on the analysis.

In an embodiment, the controller 112 may include one or more sensors 114 configured to detect a noise generated by flushing the vacuum-assisted toilet system 100. In an example, the controller 112 may direct the water source 108 and the water actuator 110 to provide at least one of more water to the toilet bowl 102 when the detected noise meets or exceeds a threshold noise or less water to the toilet bowl 102 when the detected noise falls below a threshold noise. In an example, the controller 112 may learn from the detected noise and reconfigure the operational instructions accordingly. For instance, the controller 112 may learn to increase the amount of water supplied if the detected noise exceeds a threshold value, etc.

The vacuum-assisted toilet system 100 may include one or more additional components not illustrated in FIG. 1A. For example, the vacuum-assisted toilet system 100 may include one or more additional valves, a high pressure source, and/or the accompanying pipes, as disclosed PCT Application No. PCT/US2019/023410 filed on Mar. 21, 2019, the disclosure of which is incorporated herein, in its entirety, by this reference.

Figure 2:
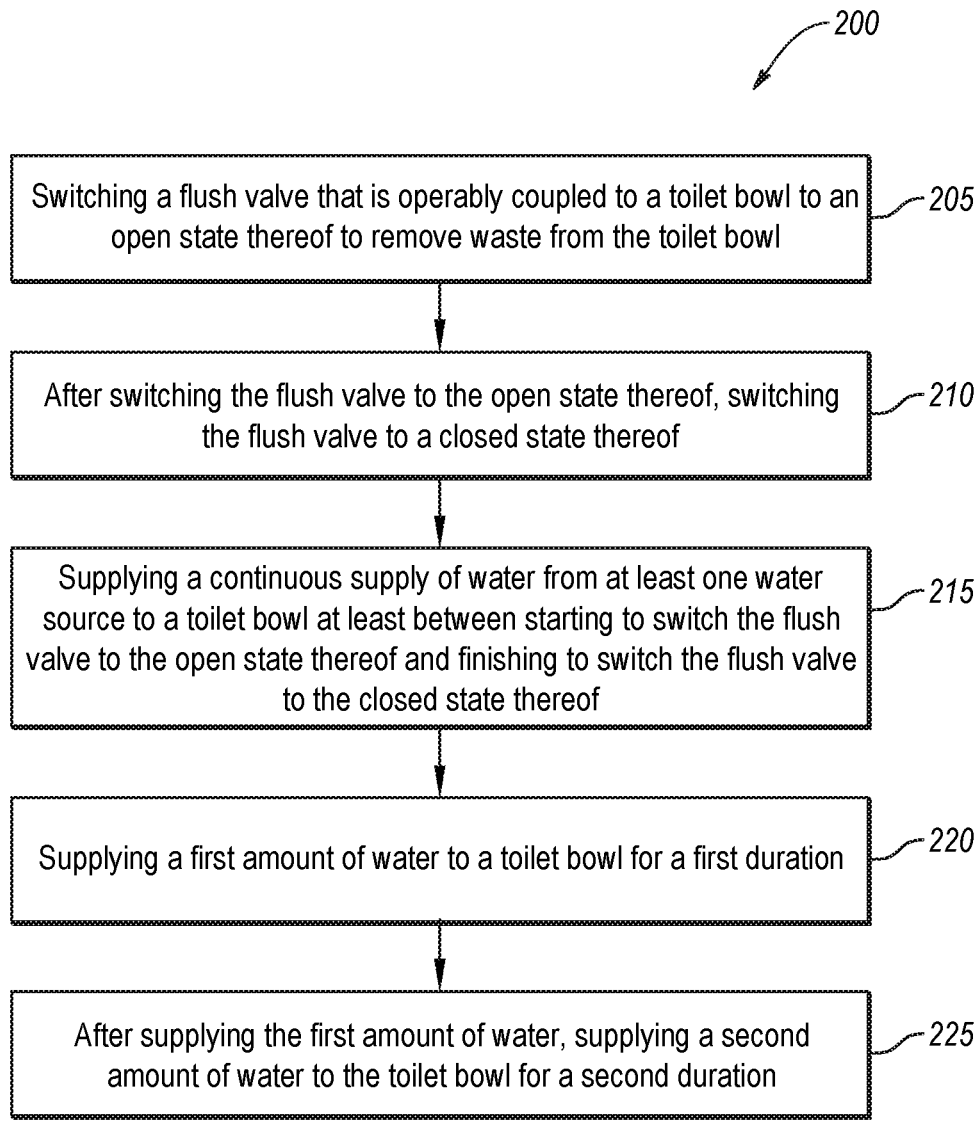
FIG. 2 is a flow chart of an example method of using any of the vacuum-assisted toilet systems disclosed herein, according to an embodiment.

FIG. 2 is a flow chart of an example method 200 of using any of the vacuum-assisted toilet systems disclosed herein, according to an embodiment. The example method 200 may include one or more actions as illustrated by one or more of acts 205, 210, 215, 220, or 225. One or more actions disclosed in the method 200 may be performed or caused to be performed in response to execution of one or more operational instructions by at least one processor.

The example method 200 may include act 205, which recites "switching a flush valve that is operably coupled to a toilet bowl to an open state thereof to remove waste from the toilet bowl." The example method 200 may also include act 210, which recites, "after switching the flush valve to the open state thereof, switching the flush valve to a closed state thereof." The example method 200 may also include act 215, which recites, "supplying a continuous supply of water from at least one water source to a toilet bowl at least between starting to switch the flush valve to the open state thereof and finishing to switch the flush valve to the closed state thereof." Act 215 may include act 220, which recites, "supplying a first amount of water to a toilet bowl for a first duration." Act 215 may also include act 225, which recites, "after supplying the first amount of water, supplying a second amount of water to the toilet bowl for a second duration."

The acts illustrated in FIG. 2 are for illustrative purposes. For example, at least one act may be performed in a different order, at least one act may be omitted from the example method 200, at least some acts may be combined, at least one act may be divided into a plurality of acts, or at least one of the act may be modified or supplemented. In an example, the method 200 may include one or more additional acts as discussed in more detail below.

In an embodiment, the method 200 may begin with at least act 205, which recites "switching a flush valve that is operably coupled to a toilet bowl to an open state thereof to remove waste from the toilet bowl." Act 205 may allow a vacuum from the vacuum source to apply a vacuum to the waste in the toilet bowl pulling the waste through the flush valve and towards a waste collection system. However, pulling the waste through the flush valve may generate a loud noise. Act 210, which includes "after switching the flush valve to the open state thereof, switching the flush valve to a closed state thereof," may end act 205.

Between acts 205 and 210, the method 200 may include act 215, which recites "supplying a continuous supply of water from at least one water source to a toilet bowl at least between starting to switch the flush valve to the open state thereof and finishing to switch the flush valve to the closed state thereof." As discussed, it has been found that providing a continuous supply of water from the water source to the toilet bowl decreases the amplitude of the noise generated by flushing the vacuum-assisted toilet systems disclosed.

Act 215 may include varying the amount of water (e.g., a water flow rate or water pressure) provided depending on the expected or detected amplitude of noise. For example, as shown in FIG. 3, the amplitude of the noise generated by flushing the vacuum-assisted toilet systems disclosed without a continuous flow of water varies greatly. As such, act 215 may include varying the amount of water as recited in at least acts 220 and 225. For example, act 220 includes "supplying a first amount of water to a toilet bowl for a first duration" and act 225 includes "after supplying the first amount of water, supplying a second amount of water to the toilet bowl for a second duration." In an embodiment, the first amount of water may be configured to reduce the amplitude of noise generate between the first and second spikes 338, 340 shown in FIG. 3 and the second amount of water may be configured to reduce the amplitude of the noise generated by the second spike 340 shown in FIG. 3. The second amount of water may be greater than the first amount of water because a larger amount of water may be needed to reduce the relatively large amplitude of the noise generated by the second spike 340. In an embodiment, the first and second amounts of water may corresponds to the other amounts of water disclosed.

As discussed regarding the operational instructions 136b-g of FIGS. 1B to 1G, act 215 may include one or more additional amounts of water either before, between, or after at least one of acts 220 or 225. In an example, act 215 may include supplying a third amount of water for a third duration before the first duration discussed in act 220. The third amount of water may be greater than the first amount of water, for example, because the third amount of water is configured to mitigate the noise generated by the first spike 338 shown in FIG. 2. In In an embodiment, act 215 includes abruptly changing the amount of water supplied by the water source to the toilet bowl, for example, as shown in FIGS. 1B, 1C, 1F, and 1G.

In an embodiment, act 215 includes gradually changing the amount of water supplied by the water source to the toilet bowl, for example, as shown in FIGS. 1D and 1E.

It is noted that the first and second durations of acts 220 and 225 (and any of the other durations disclosed herein) may be infinitesimally small (e.g., less than 0.1 seconds) or may be greater than 0.1 seconds, such as in ranges of about 0.1 seconds to about 0.5 seconds, about 0.25 seconds to about 0.75 seconds, about 0.5 seconds to about 1.0 second, about 0.75 seconds to about 1.5 seconds, about 1.0 seconds to about 2.0 seconds, about 1.5 seconds to about 3.0 seconds, about 2 seconds to about 4 seconds, or about 3 seconds to about 6 seconds.

In an embodiment, the method 200 may include sensing one or more characteristics of the toilet bowl with one or more sensors and transmitting the sensed characteristics to a controller. The controller may at least partially control the operation of one or more components of the vacuum-assisted toilet system responsive to receiving the one or more sensed characteristics, as previously discussed. In an example, the sensors may detect a volume of the waste present in the toilet bowl and, responsive to receiving the detected volume, the controller may at least one of permit the flush valve to switch to the open state, flow additional water into the toilet bowl before permitting the flush valve to switch to the open state, or select one or more operational instructions based on the detected volume. In an example, the sensors may detect a composition of the waste and the controller may at least partially control the operation of one or more components of the vacuum-assisted toilet system based on whether the waste has a high viscosity content or a low viscosity content. In an example, the sensors may detect noise at the toilet bowl and the control may at least partially control the operation of one or more components of the vacuum-assisted toilet system based on the detected noise.

The following comparative and working examples provide further detail in connection with the specific vacuum-assisted toilet systems disclosed herein.

COMPARATIVE EXAMPLE

The vacuum-assisted toilet system of the comparative example included a toilet bowl, a flush valve fluidly coupled to the toilet bowl via a first pipe, a holding tank fluidly coupled to the flush valve via a second pipe, and a vacuum pump fluidly coupled to the holding tank via a third pipe so an interior space of the holding tank is exposed to a vacuum. The first pipe exhibited a length of about 15 cm and the second pipe exhibited a length of about 5 m. The vacuum in the holding tank ranged from 5 inches of mercury (about 0.17 atmospheres) to about 20 inches of mercury (about 0.67 atmospheres). A microphone was disposed in or near the toilet bowl to detect the noise generated during use of the vacuum-assisted toilet system.

FIG. 3 is a graph illustrating noise (in decibels) detected over time after flushing (e.g., manipulating a flushing actuator) the vacuum-assisted toilet system of the comparative example over time. FIG. 3 illustrates that noise generated by operating the vacuum-assisted toilet system of the comparative example generated a first spike 338 in the amplitude of the detected noise caused by switching the flush valve to its open state and a second spike 340 in the amplitude of the detected noise caused by switching the flush valve to its closed state. The amplitude of the noise generated between the first and second spikes 338, 340, though high, was less than the amplitude of the first and second spikes 338, 340.

WORKING EXAMPLE

The vacuum-assisted toilet system of the comparative example was modified to include a water source configured to supply water to the toilet bowl and a water actuator configured to control the pressure of water to form the vacuum-assisted toilet system of the working example. The water source included a sink, a pressure reducer, and a pressure gauge that were all fluidly coupled together using pipes. The water actuator includes a programmable valve that was configured to switch between an open state and a closed state at selected times.

Figure 4:
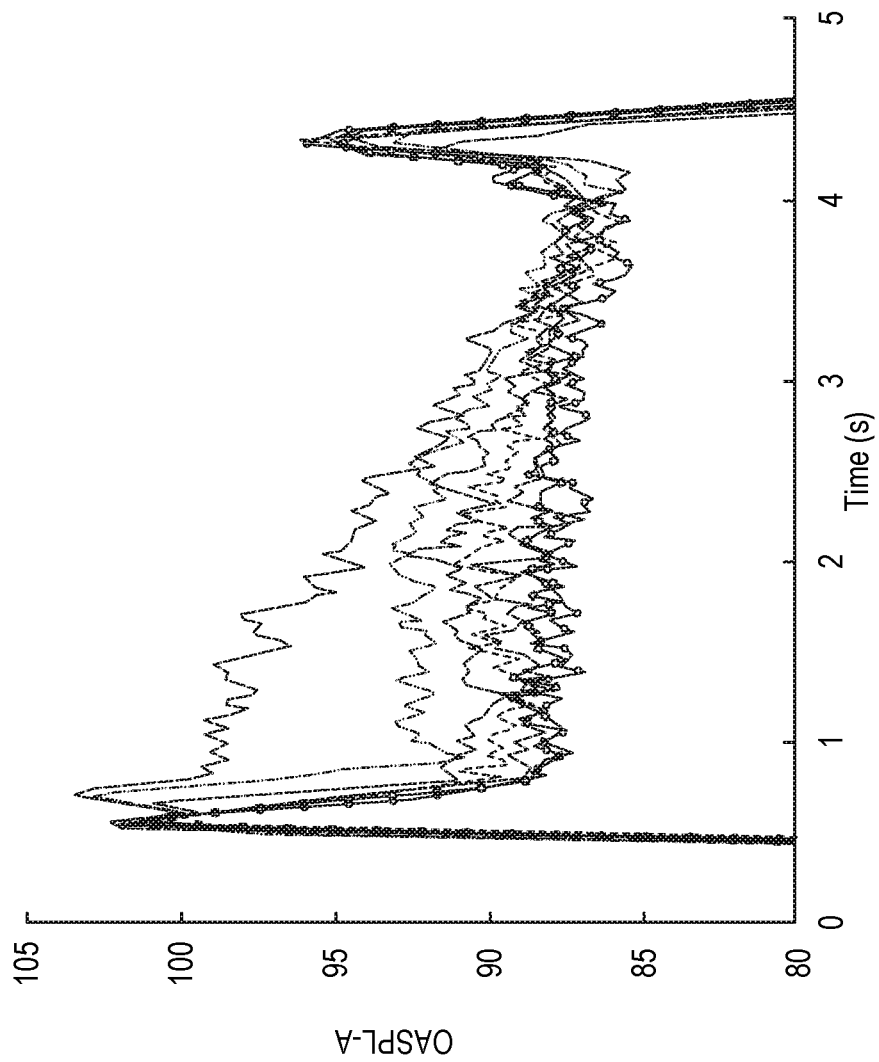
FIG. 4 is a graph illustrating the noise detected over time after flushing the vacuum-assisted toilet system of the working example during each of the plurality of first tests.

In a plurality of first tests, the vacuum-assisted toilet system of the working example was flushed while water is provided to the toilet bowl at a controlled pressure. The pressure of the water was varied for each of the plurality of first tests. FIG. 4 is a graph illustrating the noise (in decibels) detected over time after flushing the vacuum-assisted toilet system of the working example during each of the plurality of first tests. FIG. 4 demonstrates that providing a continuous supply of water to the toilet bowl reduces the amplitude of the noise generated while flushing the vacuum-assisted toilet system, especially when the pressure of the water exceeds a certain value. For example, as shown in FIG. 4, increasing the water pressure supplied to the toilet bowl to be greater than about 5 pounds per square inch ("psi") drastically decreased the amplitude of the noise generated between the first and second spikes 438, 440 and the amplitude of the noise generated by the switching the flush valve to the closed state (e.g., reduces an amplitude of the second spike 440). However, it is noted that the effect that increasing the water pressure has on reducing amplitude of the noise generated during operation generally decreases as the water pressure is increased. For example, increasing the pressure of the water from 5 psi to 9.4 psi decreases the noise generated at 1 second by about 6 decibels whereas increasing the pressure of the water from 9.4 psi to 16.5 psi only decreases the noise generated at 1 second by about 2 decibels. FIG. 4 also demonstrates that increasing the total volume of the water and, by extension, the water flow rate also decreases the amplitude of the noise.

Figure 5:
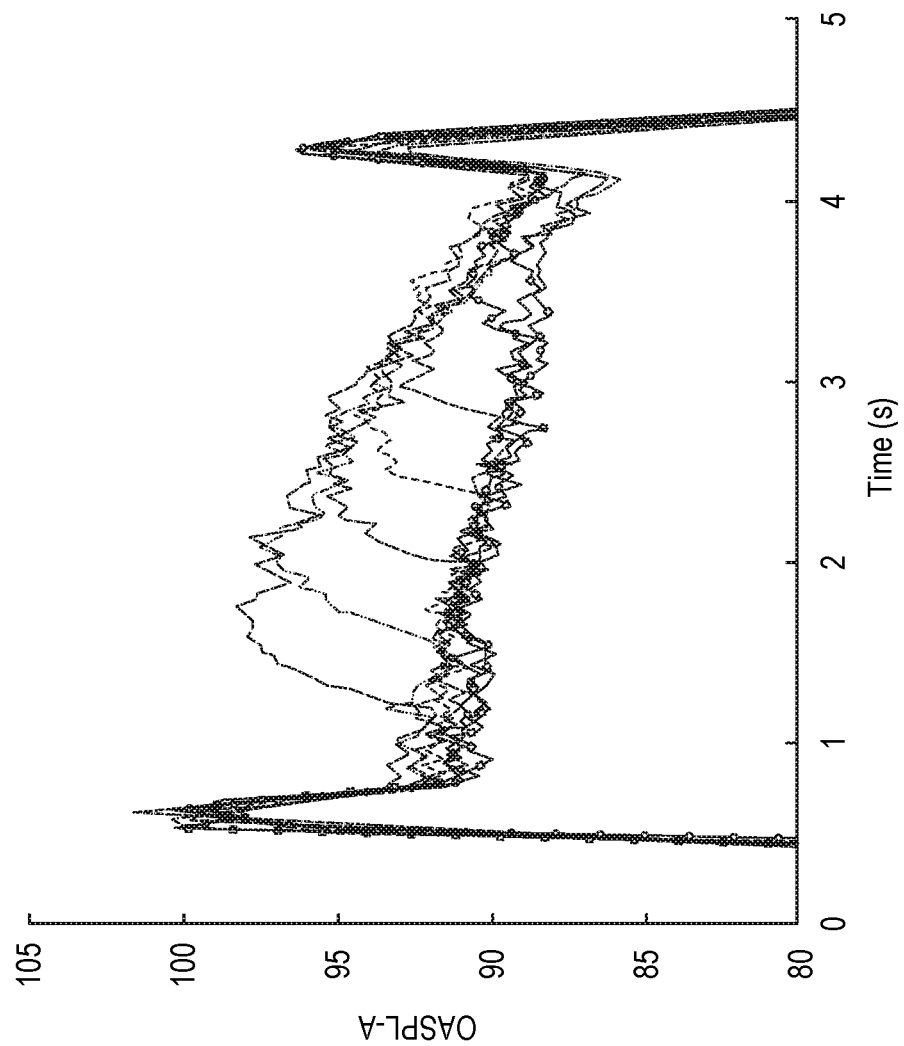
FIG. 5 is a graph illustrating the noise detected over time after flushing the vacuum-assisted toilet system of the working example during each of the plurality of second tests.

In a plurality of second tests, the vacuum-assisted toilet system of the working example was flushed while water is provided to the toilet bowl at a controlled pressure. The pressure for each of the plurality of second tests was maintained at about 20 psi. However, the rinse time for each of the plurality of second tests was varied. FIG. 5 is a graph illustrating the noise (in decibels) detected over time after flushing the vacuum-assisted toilet system of the working example during each of the plurality of second tests. As shown in FIG. 5, stopping the flow of water while the vacuum-assisted toilet system was removing waste from the toilet bowl resulted in a large and sudden increase in the amplitude of the noise detected. FIG. 5 demonstrates that providing a continuous supply of water while flushing the vacuum-assisted toilet system decreases the amplitude of the noise generated during operation of the vacuum-assisted toilet system compared to a vacuum-assisted toilet system that provides a discontinuous supply of water.

Figure 6:
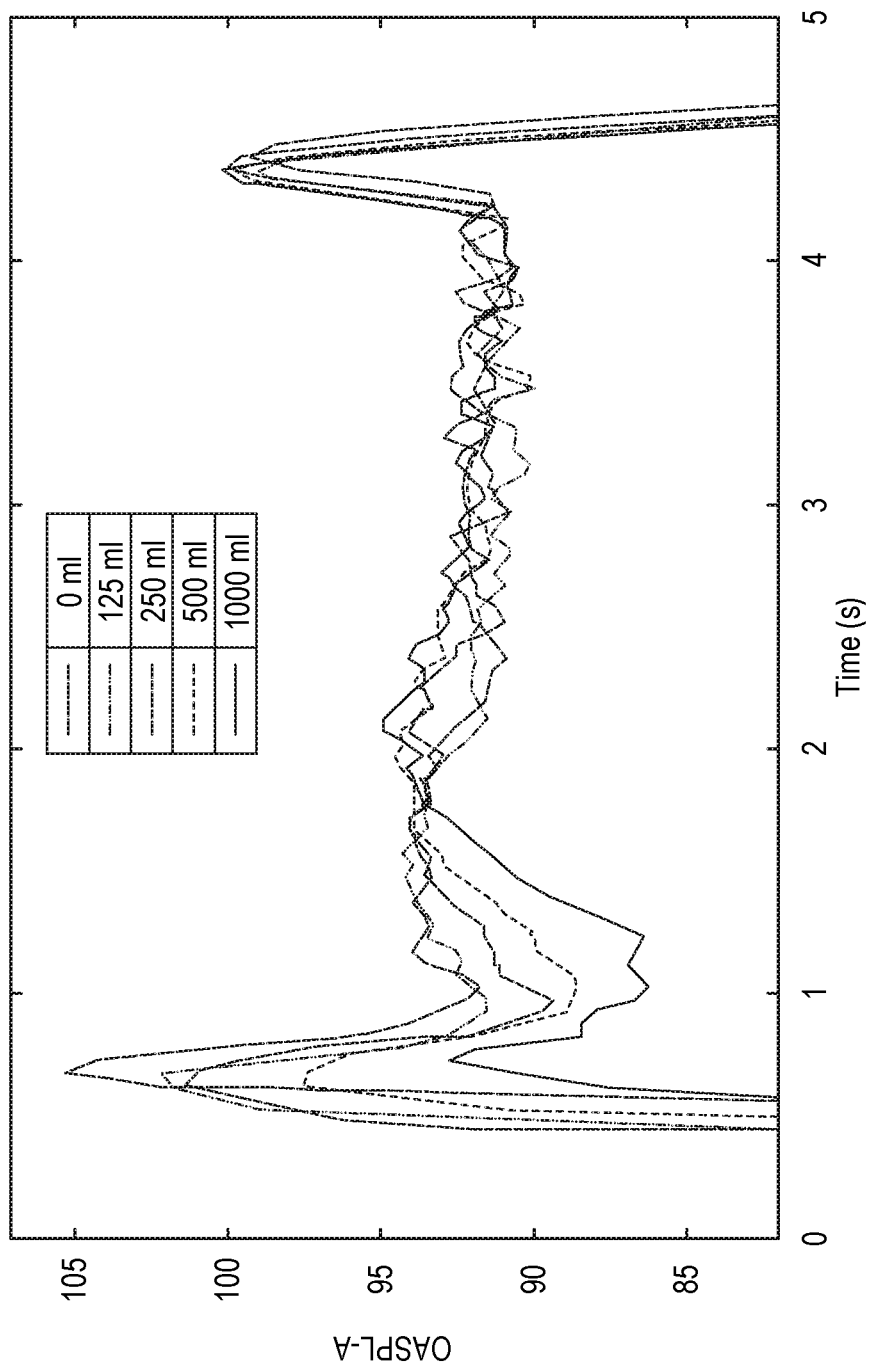
FIG. 6 is a graph illustrating the noise detected over time after flushing the vacuum-assisted toilet system of the working example during each of the plurality of third tests.

In a plurality of third test, the flush valve of the vacuum-assisted toilet system of the working example switched to the open state only after a selected amount of water was supplied to the toilet bowl. The selected amount of water supplied to the toilet bowl before the flush valve was switched to the open state thereof was varied for each of the third tests. FIG. 6 is a graph illustrating the noise (in decibels) detected over time after flushing the vacuum-assisted toilet system of the working example during each of the plurality of third tests. As shown in FIG. 6, supplying water to the toilet bowl before switching the flush valve to the open state thereof decreased the amplitude of the noise generated (e.g., decreases the amplitude of the first spike of noise). FIG. 6 also demonstrates that the noise reduction corresponds to the amount of water that is present in the toilet bowl before switching the flush valve to the open state thereof. FIG. 6 further demonstrates that increasing the amount of water in the toilet bowl increases the period during which the water initially present in the toilet bowl reduces the noise generated. For example, supplying 125 ml of water to the toilet bowl reduced the amplitude of the noise generated by flushing the vacuum-assisted toilet system for about 1 second while supplying 1,000 ml of water to the toilet bowl reduced the amplitude of the noise generated by flushing the vacuum-assisted toilet system for about 2 seconds.

While various aspects and embodiments have been disclosed herein, other aspects and embodiments are contemplated. The various aspects and embodiment disclosed herein are for purposes of illustration and are not intended to be limiting.

We claim:

1. A method for operating a vacuum-assisted toilet, the method comprising:
    switching a flush valve that is operably coupled to a toilet bowl to an open state thereof to remove waste from the toilet bowl;
    after switching the flush valve to the open state thereof, switching the flush valve to a closed state thereof; and
    supplying a continuous supply of water from at least one water source to the toilet bowl at least between starting to switch the flush valve to the open state thereof and finishing to switch the flush valve to the closed state thereof at least by:
        supplying a first amount of water to the toilet bowl for a first duration, wherein the first amount of water is at least one of a first water flow rate or a first water pressure wherein switching the flush valve to the open state thereof occurs at the beginning of or during the first duration;
        after supplying the first amount of water, supplying a second amount of water to the toilet bowl for a second duration, wherein the second amount of water is at least one of a second water flow rate that is less than the first water flow rate or a second water pressure that is less than the first water pressure; and
        after supplying the second amount of water, supplying a third amount of water to the toilet bowl for a third duration, wherein the third amount of water is at least one of a third water flow rate that is greater than the second water flow rate or a third water pressure that is greater than the second water pressure, wherein switching the flush valve to the closed state thereof occurs at the end of or during the third duration.

2. The method of claim 1, further comprising at least one of:
    before supplying the second amount of water, decreasing from the first amount of water to the second amount of water over a fourth duration; and between supplying the second amount of water and supplying the third amount of water, increasing from second amount of water to the third amount of water over a fourth duration.

3. The method of claim 1, wherein:
supplying the first amount of water to the toilet bowl for the first duration includes supplying the water at the first water pressure to the toilet bowl for the first duration;
supplying the second amount of water to the toilet bowl for the second duration includes supplying the water at the second water pressure to the toilet bowl for the second duration; and
supplying the third amount of water to the toilet bowl for the third duration includes supplying the water at the third water pressure to the toilet bowl for the third duration.

4. The method of claim 1, wherein:
supplying the first amount of water to the toilet bowl for the first duration includes supplying the water at the first water flow rate from the at least one water source to the toilet bowl for the first duration;
supplying the second amount of water to the toilet bowl for the second duration includes supplying the water at the second water flow rate from the at least one water source to the toilet bowl for the second duration; and
supplying the third amount of water to the toilet bowl for the third duration includes supplying the water at the third water flow rate from the at least one water source to the toilet bowl for the third duration.

5. The method of claim 1, further comprising, before switching the flush valve to the open state thereof, supplying at least about 100 milliliters of fluid in the toilet bowl.

6. The method of claim 1, wherein supplying the continuous supply of water from the at least one water source to the toilet bowl at least between starting to switch the flush valve to the open state thereof and finishing to switch the flush valve to the closed state thereof includes controlling an amount of water and a duration that the amount of water is supplied to the toilet bowl using at least one water actuator that is coupled to the at least one water source, wherein the amount of water is at least one of a water flow rate or a water pressure.

7. The method of claim 6, further comprising at least partially controlling the operation of the at least one water actuator with an electrical controller that is communicably coupled to the at least one water actuator, wherein the electrical controller includes one or more operational instructions stored on non-transitory memory and at least one processor configured to execute the one or more operational instructions.

8. The method of claim 7, wherein at least partially controlling one or more operations of the at least one water actuator includes, with the electrical controller:
directing the at least one water actuator to cause the water to be supplied to the toilet bowl at the first amount of water for the first duration;
directing the at least one water actuator to cause water to be supplied to the toilet bowl at the second amount of water for the second duration; and
directing the at least one water actuator to cause water to be supplied to the toilet bowl at the third amount of water for the third duration.

9. The method of claim 7, further comprising, with the electrical controller, selecting at least one of the first amount of water, the second amount of water, the third amount of water, the first duration, the second duration, or the third duration.

10. The method of claim 7, further comprising:
sensing one or more characteristics of the toilet bowl with one or more sensors; and
transmitting the one or more sensed characteristics to the electrical controller;
wherein the electrical controller at least partially controls the operation of the at least one water actuator responsive to receiving the one or more sensed characteristics.

11. The method of claim 10, wherein sensing the one or more characteristics of the toilet bowl with the one or more sensors includes determining a volume of the waste that is present in the toilet bowl before switching the flush valve to the open state thereof.

12. The method of claim 11, wherein determining the volume of the waste that is present in the toilet bowl before switching the flush valve to the open state thereof includes determining that the volume of the waste that is present in the toilet bowl before switching the flush valve to an open state thereof meets or exceeds a threshold value; and
if the volume of the waste that is present in the toilet bowl before switching the flush valve to the open state thereof does not meet or exceed the threshold value, with the electrical controller, directing the at least one water actuator to provide a sufficient amount of the water to the toilet bowl to increase the volume of the waste to meet or exceed the threshold value.

13. A method for operating a vacuum-assisted toilet, the method comprising:
switching a flush valve that is operably coupled to a toilet bowl to an open state thereof to remove waste from the toilet bowl;
after switching the flush valve to the open state thereof, switching the flush valve to a closed state thereof;
supplying a continuous supply of water from at least one water source to the toilet bowl at least between starting to switch the flush valve to the open state thereof and finishing to switch the flush valve to the closed state thereof with at least one water actuator that is fluidly coupled to the at least one water source at least by:
supplying a first amount of water to the toilet bowl for a first duration, wherein the first amount of water is at least one of a first water flow rate or a first water pressure wherein switching the flush valve to the open state thereof occurs at the beginning of or during the first duration;
after supplying the first amount of water, supplying a second amount of water to the toilet bowl for a second duration, wherein the second amount of water is at least one of a second water flow rate that is less than the first water flow rate or a second water pressure that is less than the first water pressure; and
after supplying the second amount of water, supplying a third amount of water to the toilet bowl for a third duration, wherein the third amount of water is at least one of a third water flow rate that is greater than the second water flow rate or a third water pressure that is greater than the second water pressure, wherein switching the flush valve to the closed state thereof occurs at the end of or during the third duration; and
at least partially controlling the operation of the at least one water actuator with an electrical controller that is communicably coupled to the at least one water actuator, wherein the electrical controller includes one or more operational instructions stored on non-transitory memory and at least one processor configured to execute the one or more operational instructions.

14. A vacuum-assisted toilet system comprising:
a toilet bowl;
a flush valve fluidly coupled to the toilet bowl;
at least one water source coupled to the toilet bowl that is configured to supply water to the toilet bowl;
at least one water actuator coupled to the at least one water source, the at least one water actuator configured to control an amount of water provided from the at least one water source to the toilet bowl; and
an electrical controller coupled to the at least one water actuator that is configured to at least partially control the at least one water actuator, the electrical controller including non-transitory memory storing one or more operational instructions and at least one processor configured to execute the one or more operational instructions, wherein executing the one or more operational instructions with the at least one processor causes the at least one water actuator to provide a continuous supply of water from the water source to the toilet bowl at least between starting to switch the flush valve to an open state thereof and finishing to switch the flush valve to a closed state thereof at least by:
supplying a first amount of water to the toilet bowl for a first duration, wherein the first amount of water is at least one of a first water flow rate or a first water pressure wherein switching the flush valve to the open state thereof occurs at the beginning of or during the first duration;
after supplying the first amount of water, supplying a second amount of water to the toilet bowl for a second duration, wherein the second amount of water is at least one of a second water flow rate that is greater than the first water flow rate or a second water pressure that is greater than the first water pressure; and
after supplying the second amount of water, supplying a third amount of water to the toilet bowl for a third duration, wherein the third amount of water is at least one of a third water flow rate that is greater than the second water flow rate or a third water pressure that is greater than the second water pressure, wherein switching the flush valve to the closed state thereof occurs at the end of or during the third duration.

15. The vacuum-assisted toilet system of claim 14, wherein executing the one or more operational instructions with the at least one processor causes the at least one water actuator to, before supplying the first amount of water, supplying a third amount of water to the toilet bowl for a third duration, wherein the third amount of water is at least one of a third water flow rate that is greater than the first water flow rate or a third water pressure that is greater than the first water pressure.

16. The vacuum-assisted toilet system of claim 14, further comprising one or more sensors that are communicably coupled to the electrical controller, the one or more sensors configured to sense one or more characteristics of the toilet bowl and transmit the one or more sensed characteristics to the electrical controller; and
wherein the electrical controller at least partially controls the at least one actuator responsive to receiving the one or more sensed characteristics.

17. The vacuum-assisted toilet system of claim 16, wherein the one or more sensors includes at least one level sensor, at least one optical sensor, or at least one scale.

18. The vacuum-assisted toilet system of claim 16, wherein the one or more sensors includes one or more of at least one acoustic sensor or at least one pH sensor.

* * * * *